June 30, 1959  M. P. WINTHER  2,892,365
FOUR SPEED PLANETARY TRANSMISSION
Filed Sept. 27, 1954
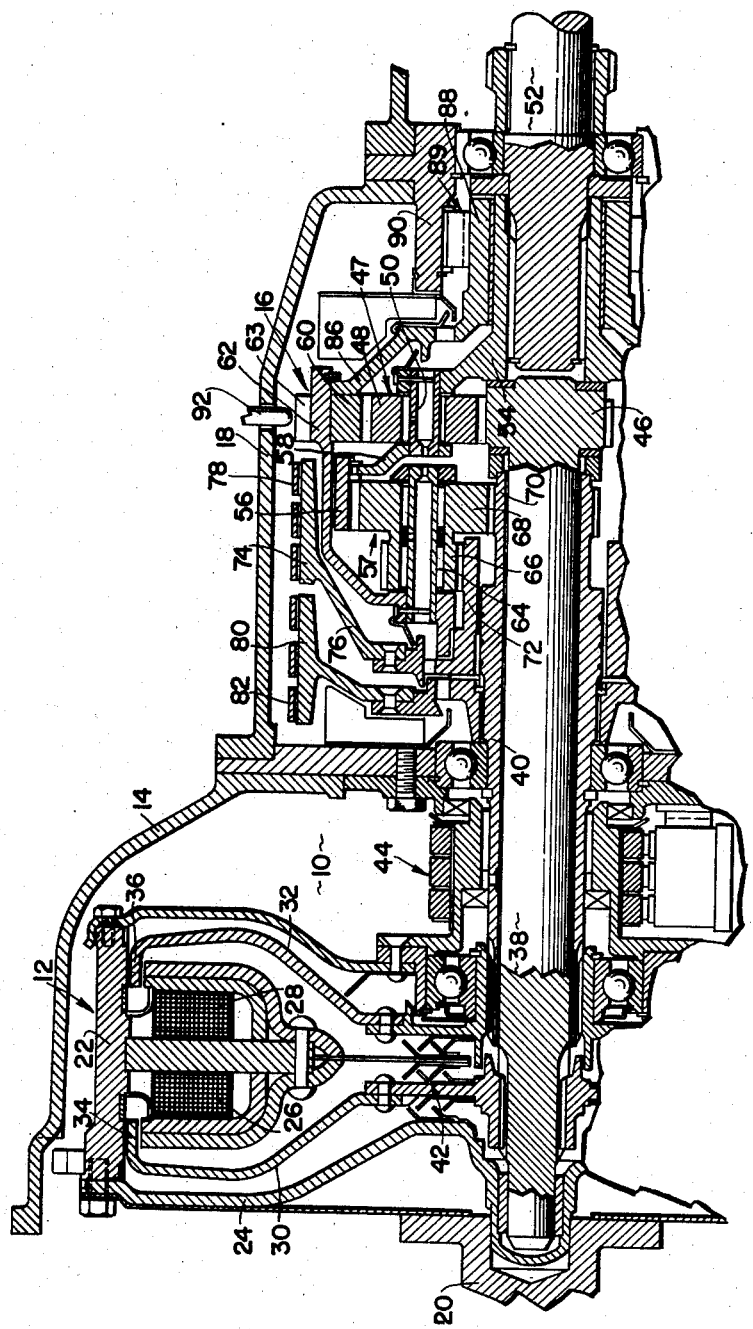
INVENTOR.
MARTIN P. WINTHER
BY
ATTORNEYS

United States Patent Office 2,892,365
Patented June 30, 1959

2,892,365

FOUR SPEED PLANETARY TRANSMISSION

Martin P. Winther, Gates Mills, Ohio, assignor to Eaton Manufacturing Company, Cleveland, Ohio, a corporation of Ohio Application September 27, 1954, Serial No. 458,625

12 Claims. (Cl. 74—759)

The present invention relates to a transmission and more particularly to certain features of a plural speed transmission especially adapted for use in automotive vehicles and the like machinery but having other uses as well.

Broadly, the present invention, which constitutes an improvement over the transmission of Patent #2,540,639, comprehends the provision of a plural speed transmission including a pair of tandem connected planetary gear sets and a pair of selectively engageable brakes for controlling movement of certain components of the gear sets and being cooperable with a pair of selectively engageable clutch output members for selectively rotating certain of the sun gears of the gear sets. Engagement or disengagement of certain brake and clutch output members for providing movement and braking of certain gears provides a plural speed transmission from the clutch input to the planetary system output shaft.

It is an object of the present invention to provide a plural speed transmission adaptable for use in automotive vehicles and the like.

It is another object of the present invention to provide a plural speed transmission that is simple and compact of structure and design, economical in maintenance, and efficient in operation.

Another object of the present invention is to provide a plural speed transmission facilitating delivery of torque in any required ranges.

A further object of the present invention is to provide a plural speed transmission in which changes in speed and torque are made easily, quickly and smoothly.

A yet further object of the present invention is to provide a plural speed transmission having a pair of controlling brakes with self-energizing brake bands for quick release and shift of the gears of the transmission, avoiding undesirable parasitic drag and lost torque.

The single figure of the drawing depicts the present invention in a sectional side view.

In the present invention, a four speed drive is achieved through the use of a pair of planetary gear sets, one set having the conventional sun, ring and planetary gears and the other having a pair of separate sun gears cooperable with a pair of integrally connected planetary gears and a ring gear.

The sun gear of one set is selectively driven by one of the clutch output members. One of the sun gears of the second set is selectively driven by the other of the clutch output members and is also selectively held stationary by a first self-energizing brake while the other sun gear of the second set is selectively held stationary by a second self-energizing brake. The output shaft of the transmission is connected to the axial supporting shaft of the first planetary gear and to the ring gear of the second planetary set.

For forward drive at various speeds, the first sun gear provides the driving torque to the transmission and through appropriate braking action of one or the other of the brakes and drive through the other of the clutch output members, any one of the four speeds of the transmission may be obtained.

Referring now more particularly to the drawing for a detailed description of the invention wherein 10 represents generally the transmission having a clutch apparatus 12 enclosed in a housing 14 and a gear mechanism 16 enclosed in a housing 18, it being understood that the transmission is physically situated in an automobile or the like machine between the engine and drive shaft for providing a coupling therebetween.

The input to the transmission is provided by a shaft 20 connected at one end thereof to the engine output and to a clutch input member 22 through a spider 24 at the other end. The clutch input member has mounted thereon a pair of annular coils 26 and 28 to provide a magnetic flux field for a purpose to be described. A pair of clutch output members 30 and 32 having axil portions 34 and 36 traversing the magnetic flux path of the clutch are provided for variable coupling to clutch input member 22 and are connected, respectively, to shaft 38 and tubular shaft 40 by some suitable means. Labyrinth seal means 42 is provided for retaining any fluent material within the enclosure of the input member and for excluding any foreign matter therefrom. A set of slip rings 44 enable electrical connection of the coils 26 and 28 to an outside source of electrical energy.

Referring now more particularly to gear apparatus 16 for a detailed description of the novel features of the present invention, 46 represents a sun gear of a planetary gear set 47 integral with shaft 38 and rotatable therewith. Sun gear 46 is engageable with a planetary gear 48 supported on a shaft 50, said shaft 50 which is in turn coupled with an output shaft 52 through a planet carrier cage or spider member 54 at one end thereof and coupled with a ring gear 56 of another planetary gear set 57 through a spider 58 at the other end thereof. A ring gear 60 of the planetary set 47 is supported by a rotatable housing or cage 62 which is connected at one end to a shaft 64 providing a support for a pair of integrally connected planetary gears 66 and 68. Housing 62 is provided with a toothed portion 63 into which a latch or pawl 92 is engaged for holding the planetary gear housing stationary for certain desired operations to be described. Planetary gear 68 is engageable with ring gear 56 and is also in gearing engagement with a sun gear 70 which is driven by tubular shaft 40. Planetary gear 66 is in engagement with a sun gear 72 which is connected to a brake drum 74 through a spider 76 and other suitable connections. A helical brake band 78, preferably of the self-energizing type, is provided for frictional engagement with drum 74 for selective control of rotation thereof. A second brake having a drum 80 and a self-energizing band 82 is provided for selective control of the rotation of tubular shaft 40 and sun gear 70 through a spider 84 and other appropriate connections.

Housing 62 is rigidly attached to a spider 86 which extends and is connected to an inner race 88 of a one-way brake mechanism 89 having a stationary outer race 90.

In the transmission, bearings, seals, insulation, and other features incidental to the invention are provided at appropriate locations to perform their usual functions but will not be fully described herein.

Hereinafter, all references to clockwise and counter-clockwise rotations assume that the figure of the drawing will be viewed from the left which is the engine or front side of the transmission.

In operation of the present invention, it is desired to transmit torque through the transmission sequentially in different ranges, or in other words, to provide different gear ratios for the drive from the engine to the drive wheels. In first or low gear, clutch 22—30 is engaged for power drive and clutch 22—32 is disengaged along with brakes 74—78 and 80—82. In this condition, shaft 38 is driven by clutch output member 30 and in turn drives integrally connected sun gear 46 causing rotation thereof in the clockwise direction. The effect of this rotation is to cause planetary gear 48 to rotate in a counterclockwise direction and tend to cause ring gear 60 and housing 62 to rotate in a counterclockwise direction. Housing 62, however, is restrained from counterclockwise rotation by the effect of one-way brake mechanism 89 resulting in a clockwise rotation of the axial shaft 50 of planetary gear 48 carrying therewith spider 54 and output shaft 52. The ratio of gearing is such as to provide suitable first or low speed operation under the circumstances which in the present instance is 3.8 to 1.

For an understanding of second gear operation, it will be noted that while operating in low gear, ring gear 56 is rotating in a clockwise direction at the same speed as output shaft 52 and clutch output member 32, brake drums 74 and 80 turn in counterclockwise directions. If self-energizing brake band 78 is now engaged so that drum 74 and consequently sun gear 72 are held stationary, the result will be that ring gear 56 will be caused to turn in a clockwise rotation at a higher speed than it will if overrunning brake 89 is engaged. The increased rotation results from the fact that planetary gears 66 and 68 rotate in a clockwise direction on sun gear 72, imparting a clockwise rotation to housing 62 and to ring gear 60 thereby giving planetary gear 48 and output shaft 52 an increased motion. The ratio of gearing is suitable for second gear operation which in the present instance is 2.27 to 1.

For operation in third gear, self-energizing brake band 82 is engaged and brake band 78 is simultaneously released resulting in a clockwise rotary movement of housing 62 at a speed determined by the ratio of the planetary set comprising gears 56, 68, and 40. In the present instance, a desirable ratio for this third speed was found to be 1.58. As pointed out hereinabove, the brake bands 78 and 82 are of the self-energizing type and act to a certain extent like overrunning clutches, and the reversal of torque direction on drum 74 will cause band 78 to release very quickly and thus, a shift effected by closing band 78 and opening band 82 will not cause a jerk such as would be the case if both bands were held closed simultaneously.

It is next assumed that it is desired to operate the automobile in fourth or high gear. This is effected by releasing band 82 (which releases very quickly due to its self-energizing feature with reversal of torque against it) and the energization of clutch 22—32. This will cause all of the gear clusters to rotate as a common unit and overrunning brake 88—90 will be free wheeling, giving direct drive. Under these conditions, clutch 22—30 will carry approximately two-third engine torque and clutch 22—32 will carry approximately one-third engine torque. However, the whole unit will operate as an integral package, and brake bands 78 and 82 will be released. Clutch coils 26 and 28 in direct drive are operated in series, thus reducing the current flow for economy in use of electrical energy for clutch operation. In direct drive there is, of course, a 1 to 1 ratio in turns of the engine to turns of the drive shaft 52.

It is next assumed that it is desired to operate the automobile in reverse gear. For this operation, it is first necessary to engage a pawl 92 in the teeth 63 on the outside diameter of planetary housing 62. This locks the planet housing from rotation in either direction. Now, if clutch 22—32 is engaged through energization of coil 26, sun gear 70 will rotate in a clockwise direction and shaft 64 being held stationary will cause planetary gear 68 to rotate ring gear 56 in a counterclockwise direction or in a direction reverse to that of the engine, giving a reverse drive to the drive wheels of the automobile. In this instance, a desirable reverse gear ratio is found to be 3.82 to 1. It should be noted that if clutch 22—30 is engaged rather than clutch 22—32, the rotation of sun gear 70 will be reversed or counterclockwise and consequently the drive shaft will be driven in a clockwise direction giving a low speed drive at approximately the same ratio as ordinary low gear without the use of overrunning brake 89.

It is significant that the present transmission can be instantly and simply changed from forward to reverse by switching electrically from the coil 26 to clutch 22—30 to coil 28 of clutch 22—32 and vice versa by means of a circuit arrangement not forming a part of this invention and therefore, not described in detail.

It should be noted that the present transmission provides marked advantages over the conventional type of hydraulic torque converters and step transmission types in that its initial and maintenance costs are materially lower and that its efficiency of operation is materially higher. It is obvious that there is no slip when driving in any gear except during starting in low gear, therefore, the efficiency of this transmission is equal to that of any manually operated shiftable transmission employing friction clutches.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. In a transmission for coupling a prime mover to a driven member comprising a first sun gear driven by a first shaft, a second sun gear driven by a second shaft and a third sun gear connected to a rotatable brake drum, a planetary gear meshing with said first sun gear, a third shaft supporting said planetary gear for rotation thereon, a rotatable arm connecting one end of said third shaft to said driven member, a first ring gear, a rotatable housing carrying said ring gear, a one-way brake for controlling rotation of said housing, a second ring gear, an arm attached to said second ring gear and the other end of said third shaft, second and third integrally connected planetary gears, said second planetary gear meshing with said second ring gear and said third planetary gear meshing with said third sun gear, a shaft for supporting said second and third planetary gears for rotation thereon and being connected to said housing for rotation therewith, a second brake drum connected to said second sun gear, a pair of self-energizing brake bands operable respectively to brake the movement of said brake drums, and a clutch having a power input member and a pair of output members adapted for coupling engagement with said input member connected respectively to said first and second sun gears, said clutch output members and said self-energizing brake bands being selectively operable for driving said sun gears independently or jointly and for controlling rotation of said sun gears to provide a shiftable, multiple speed transmission.

2. In a transmission for coupling a prime mover to a driven member comprising first, second, and third sun gears, a first planetary gear, second and third integrally connected planetary gears, a first ring gear, a rotatable housing carrying said first ring gear, a second gear, a pair of self-energizing brakes, each including a brake drum and a brake band, a clutch having a power input member and a pair of clutch output members adapted to have coupling engagement with said input member connected, respectively, to said first and second sun gears, said first planetary gear meshing with both said first sun gear and said first ring gear, an arm connected to said driven member and supporting said first planetary gear for rotation thereon, said arm having said second ring gear attached thereto, said second planetary gear meshing with both said second ring gear and said second sun gear and being supported for rotation by said housing, said first brake drum being connected to said second sun gear and said second brake drum being connected to said third sun gear, and a one-way brake for controlling rotation of said housing in one direction only, said clutch output members and said brake bands being selectively operable for controlling said transmission components to provide a plural speed shiftable coupling.

3. In a plural speed transmission for coupling a prime mover to a driven member comprising a pair of planetary gear sets, a power input member, a pair of clutch output members adapted to have coupling engagement with said input member coupled to said gear sets, the first set of said planetary gear sets comprising a sun, planetary and ring gears, said ring gear being mounted in a rotatable housing, a pawl, said housing having teeth thereon engageable with said pawl to lock said housing from rotation, a one-way brake to prevent rotation of said rotatable housing in one direction, the second of said planetary sets including a ring gear, a pair of independent sun gears and a pair of integral planetary gears, a rotatable arm coupled to said driven member, said housing providing axial rotary support for said integral planetary gears, the ring gear of said second planetary set and the planetary gear of said first planetary set being connected to and supported by said arm, a pair of brakes each having a brake drum and a brake band engageable with said drum, said drums being connected, respectively, to said independent sun gears, said clutch output members being connected, respectively, to said pair of independent sun gears, said pawl being engageable with the teeth on said housing, said clutch output members, said brakes, said pawl and said one-way brake being selectively operable to control movement of said gears to provide a plural speed, including reverse, transmission coupling.

4. A transmission comprising a driving element, a pair of individually controlled clutches driven thereby, a driven member, a rotary structure, a reverse locking brake limiting motion of the structure to a direction with the driving element, a planetary gear train connecting one of said clutches with the driven member and reacting against said structure, said gear train including a second structure rotary with the driven member, a second planetary gear train connecting the other clutch and said second structure, a brake controlling the output rotation of said other clutch, a brake for controlling the operation of the second mentioned gear train, said second gear train including a ring gear connected to said second structure for rotation therewith, a planet gear cluster, and two sun gears, one having meshing engagement with one gear of said gear cluster and the other having meshing engagement with another gear of said gear cluster, and wherein one of said gears of said gear cluster meshing with one of said sun gears has meshing engagement with said ring gear.

5. A transmission according to claim 4 wherein the first gear train includes a ring gear connected to said first rotary structure, a planet gear rotatably supported on said second structure having meshing engagement with said ring gear of said first gear train and a sun gear having meshing engagement with said planet gear rotatably supported on said second structure.

6. A transmission according to claim 5 wherein said one of said sun gears of said second gear train is connected with said one of said clutches, and wherein said other of said sun gears of said second gear train in inhibited from rotation by the second mentioned brake.

7. A transmission according to claim 6 wherein said sun gear of said first gear train is connected with said other of said clutches.

8. A transmission according to claim 7 wherein said clutches are of the electromagnetic operable type.

9. In a transmission for coupling a prime mover to a driven member comprising first and second planetary gear sets, the planetary gear of said first set being supported for rotation on a carrier, said carrier being coupled to the ring gear of said second set and the ring gear of said first set being coupled to a second carrier, said second carrier supporting for rotation thereon the planetary gear of said second set, a one-way brake provided to limit said second carrier to rotation in one direction, a first sun gear meshing with the planetary gear of said second set, and a brake drum connected therewith for unitary rotation, a planetary gear integral with the planetary gear of said second set, a second sun gear meshing with said integral planetary gear, a second brake drum connected to the second sun gear of said second planetary gear set, a pair of brake bands for controlling rotation of said brake drums, a third sun gear meshing with the planetary gear of said first planetary gear set, a power input member and a pair of clutch output members connected respectively to said first and third sun gears and adapted to have coupling engagement with said power input member, said clutch output members and said brake bands being selectively operable to control movement of said components to provide a plural speed shiftable transmission coupling, said first carrier being connected to said driven member of the transmission.

10. In a transmission for coupling a prime mover to a driven member comprising a pair of planetary gear sets, each of which includes a planet gear carrier, meshing sun, ring and planet gears, said ring gear of one of said gear sets connected for conjoint rotation with said planet gear carrier of the other of said gear sets and for conjoint rotation with said driven member, a power input member, a pair of clutch output members adapted to be coupled to said input member selectively operable for driving certain components of said gear sets, a pair of selectively operable brakes for controlling rotation of different components of said one gear set, and a one-way brake limiting the direction of rotation of the ring gear of said other gear set to provide a plural speed shiftable coupling.

11. In a plural speed transmission comprising a planetary gear set coupled between a prime mover and a driven member having a sun, planetary and ring gear, a second planetary gear set having a ring gear, a pair of sun gears and a pair of integral planetary gears, carrier means connected to the ring gear of the first planetary set and supporting the pair of integral planetary gears for rotation, a second carrier means connected to the ring gear of the second planetary gear set and supporting the planet gear of the first planetary gear set for rotation such that the rotary movement of the ring gear of said second gear set is coincident with the orbital movement of the planetary gear of said first set and the rotary movement of the ring gear of said first set is coincident with the orbital movement of the planetary gear of the second set, a pair of brake drums and a cooperating self-energizing brake band for each of said drums, each of said drums being connected, respectively, to a sun gear of said second planetary set, a one-way overrunning brake having one race thereof stationary and the other race thereof movable with the ring gear of said first set, said one-way brake limiting rotation of said last mentioned ring gear to one direction, a power input member driven from the prime mover and a pair of clutch output members adapted to have coupling engagement with the input member, one of which is coupled to a sun gear of the second planetary gear set and the other of which is coupled to the sun gear of the first planetary gear set, said clutch output members and said brakes being selectively operable to selectively provide rotary motion to certain components of said gear sets to provide a shiftable, plural speed transmission coupling, said second carrier means being connected to said driven member of the transmission.

12. A transmission comprising a driving element, a pair of individually controlled clutches driven thereby, a driven member, a rotary structure, a reverse locking brake limiting motion of the structure to a direction with the driving element, a first planetary gear train connecting one of said clutches with the driven member and reacting against said structure, a second planetary gear train including a ring gear, a second structure conjointly rotatable with said ring gear and with the driven member, said second planetary gear train connecting the other clutch and said second structure, a brake controlling the output rotation of said other clutch, a brake for controlling the operation of said second planetary gear train and means for inhibiting rotation of said first rotary structure.

References Cited in the file of this patent

UNITED STATES PATENTS

| | | |
|---|---|---|
| 2,540,639 | Winther et al. | Feb. 6, 1951 |
| 2,700,312 | Smirl | Jan. 25, 1955 |
| 2,749,777 | Simpson | June 12, 1956 |